United States Patent

Van Der Putten et al.

[11] Patent Number: 5,903,612
[45] Date of Patent: May 11, 1999

[54] METHOD TO SYNCHRONIZE DATA AND A TRANSMITTER AND A RECEIVER REALIZING SAID METHOD

[75] Inventors: Frank Octaaf Van Der Putten, Hombeek; Paul Marie Pierre Spruyt, Heverlee; Karel Adriaensen, Antwerp, all of Belgium

[73] Assignee: Alcatel Alsthom Compagnie Generale d'Electricite, Paris, France

[21] Appl. No.: 08/965,136

[22] Filed: Nov. 6, 1997

Related U.S. Application Data

[60] Provisional application No. 60/052,126, Jul. 10, 1997.

[30] Foreign Application Priority Data

Nov. 8, 1996 [EP] European Pat. Off. .............. 96402393

[51] Int. Cl.⁶ .................................................. H04L 27/06
[52] U.S. Cl. .......................... 375/316; 375/295; 375/222; 370/395; 370/396
[58] Field of Search .................................... 375/219, 222, 375/370, 358, 316, 295, 354, 356; 370/395, 396, 505, 508, 304

[56] References Cited

U.S. PATENT DOCUMENTS

| | | | |
|---|---|---|---|
| 5,003,558 | 3/1991 | Gregg | 375/357 |
| 5,430,724 | 7/1995 | Fall et al. | 370/79 |
| 5,434,892 | 7/1995 | Dike et al. | 375/377 |
| 5,625,651 | 4/1994 | Cioffi | 375/354 |
| 5,787,114 | 1/1996 | Ramamurthy et al. | 375/221 |

*Primary Examiner*—Wellington Chin
*Assistant Examiner*—Congvan Tran
*Attorney, Agent, or Firm*—Ware, Fressola, Van Der Sluys & Adolphson LLP

[57] ABSTRACT

A method to realize synchronization in a receiver (RX), of data (DAT) sent from a transmitter (TX) to the receiver (RX), with a signal (SIG) available in the receiver (RX). The method includes the following steps:

in the receiver (RX) generating trigger signals (T) from the signal (SIG) available in the receiver sending the trigger signals (T) from the receiver (RX) to the transmitter (TX); and upon receipt of the trigger signals (T) by the transmitter (TX) sending the data (DAT) from the transmitter (TX) to the receiver (RX).

8 Claims, 1 Drawing Sheet

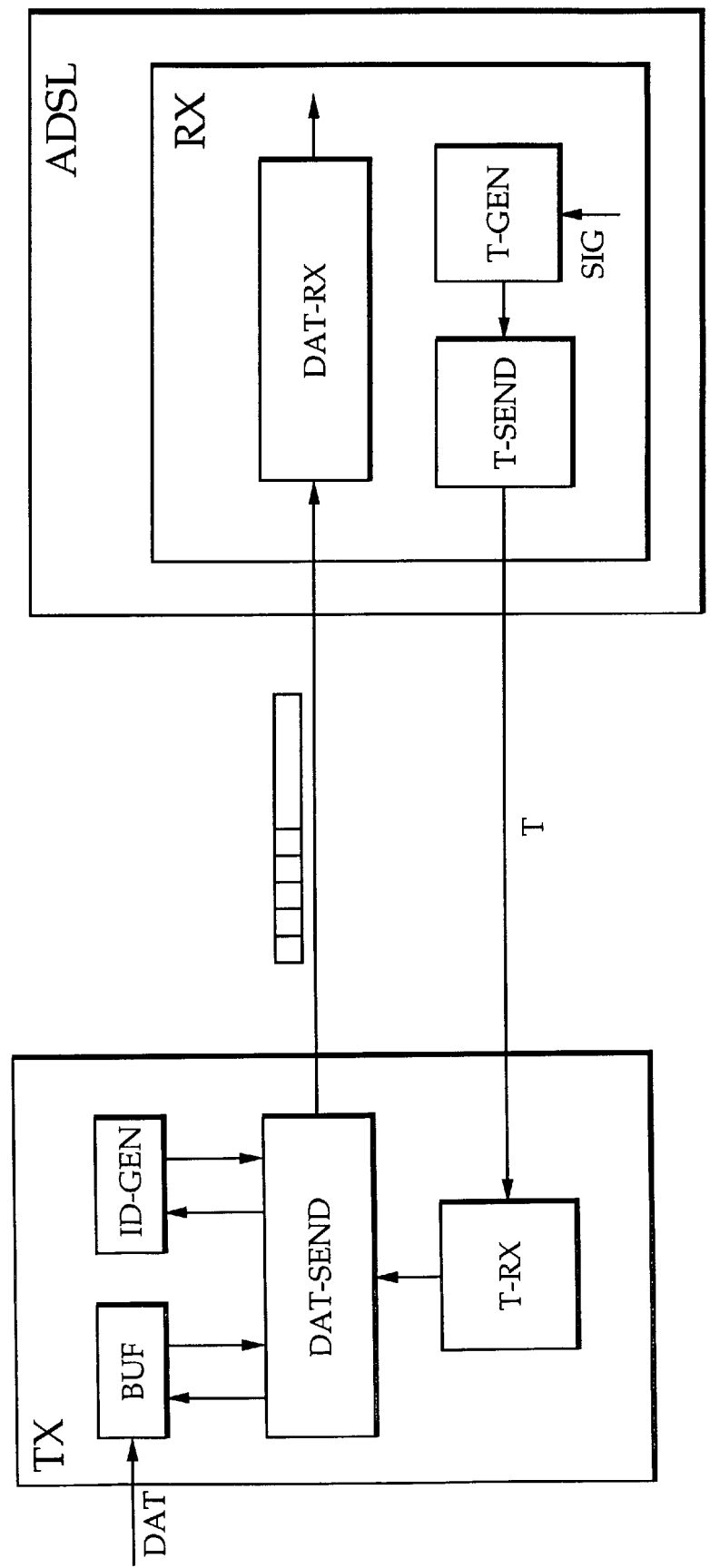

METHOD TO SYNCHRONIZE DATA AND A TRANSMITTER AND A RECEIVER REALIZING SAID METHOD

In addition to claiming priority under 35 USC §119(a) from EPO Application 96402393.1 filed Nov. 8, 1996, this application also claims the benefit under 3 USC §119(e) of U.S. Provisional Application No. 60,052,126, filed Jul. 10, 1997.

BACKGROUND OF THE INVENTION

1. Technical Field

The present invention relates to a method to synchronise data and a transmitter and a receiver realizing said method.

2. Discussion of Related Art

Such a method to synchronise data is common knowledge. Indeed, e.g. in communication systems where data is sent from a transmitter to a receiver, for the receiver to be able to interpret the received data, the received data have to be synchronized in the receiver with a reference signal, usual a clock signal of the receiver. Realizing synchronization implies more complexity and therefore there is a need for additional hardware or software in the receiver. The trade-offs are generally between expense and complexity, on one hand, and error performance on the other hand. However, some kind of receivers e.g. receivers using asymmetric digital subscriber line technology are required to have both, a low complexity and also a low error performance.

SUMMARY OF INVENTION

An object of the present invention is to provide a method to synchronize data and a transmitter and a receiver realizing said method of the above known type but which are suited for use in communication systems where a low complexity and a low error performance are required at the receiving side of the communication system. According to a first aspect of the invention, a method to realize synchronization in a receiver, of data sent from a transmitter to said receiver, with a signal available in said receiver, is characterized in that said method includes the steps of: in said receiver generating trigger signals from said signal available in said receiver, sending said trigger signals from said receiver to said transmitter, and upon receipt of said trigger signals by said transmitter sending said data from said transmitter to said receiver.

According to a second aspect of the invention a receiver for receiving data from a transmitter, said data having to be synchronous with a signal available in said receiver is characterized in that said receiver includes trigger generating means to generate trigger signals from said signal available in said receiver, trigger sending means to send said trigger signals from said receiver to said transmitter and data receiving means to receive said data sent by said transmitter to said receiver upon receipt of said trigger signals.

According to a third aspect of the invention, a transmitter for transmitting data to a receiver, said data having to be synchronous with a signal available in said receiver, is characterized in that said transmitter includes trigger receiving means to receive trigger signals, generated by said receiver from said signal available in said receiver and sent from said receiver to said transmitter, and data sending means to send data from said transmitter to said receiver upon receipt of said trigger signals.

Indeed, due to the trigger signals generated from the signal available in the receiver and sent to the transmitter, the transmitter is able to sand the data to the receiver upon receipt of the trigger signals i.e. at the right time to ensure synchronization between the data received in the receiver and the available signal e.g. a clock signal in the receiver. In this way, the complexity of the synchronization process is moved from the receiver side to the transmitter side of the communication system and each level of synchronization can be realized with the required level of error performance and without making the receiver too complex.

Another characteristic feature of the present invention is that the data, sent from the transmitter to the receiver, is asynchronous data. Indeed, upon receipt of the trigger signals, the transmitter must be able to send data even if the trigger signals are sent in an asynchronous way. This is for instance the case when the receiver has to receive the data at a time moment at which the data has just to fit at a predefined place in a frame. In this way frame synchronization is achieved.

Yet another characteristic feature of the present invention is that in the event that no data is available in the transmitter to be sent upon receipt of the trigger signals, the transmitter is able to generate idle data and to send this idle data to the receiver. In this way, e.g. the frame synchronization process is not disturbed.

An important application of the present invention is that the receiver is included in an asymmetric digital subscriber line (ADSL) modem. In such receiver, the received data is framed into an asymmetric digital subscriber line frame and sent over a twisted pair. However in known ADSL modems using the known synchronization methods, when the modem receives data at a higher frequency than the frequency at which the data is sent, the data has to be buffered before being framed. As already mentioned above, it is important to keep the complexity of a receiver in such a modem low. By using the method of the invention, the asymmetric digital subscriber line modern gets rid of i.e., avoids the buffering aspect. In fact the buffering is again moved from the receiver to the transmitter which now must be able to buffer the data until it receives a trigger signal of the receiver to have the permission to sent the data to the receiver. Therefore, this way of synchronizing is expecially suited for systems wherein there is anyway buffering foreseen at the transmitting side, e.g. for Asynchronous Transmission Mods (ATM) systems.

BRIEF DESCRIPTION OF THE DRAWING

The above mentioned and other objects and features of the invention will become more apparent and the invention itself will be best understood by referring to the following description of an embodiment taken in conjunction with the accompanying sole figure which is a schematic block diagram of a synchronization system: including a transmitter and a receiver realizing the method of the invention.

DETAILED DESCRIPTION OF PREFERRED EMBODIMENT

Referring to the figure, the working of the synchronization system will be described. First, the working of the synchronization system will be explained by means of a functional description of the blocks shown in the Figure. Based on this description, implementation of the functional blocks will be obvious to any person skilled in the art and will therefore not be described in detail. In addition, the principle working of the synchronization system will be described in further detail.

The synchronization system includes a transmitter TX and an asymmetric digital subscriber line modem (ADSL modem) ADSL. The transmitter TX includes four functional blocks:

a buffer BUF;

an idle data generating means ID-GEN a data sending means DAT-SEND; and a trigger receiving means T-RX.

The buffer BUF is included to buffer the data DAT presented to the transmitter TX. This data DAT can be digital data of any kind, however, for this embodiment the data DAT is asynchronous data i.e. data organized following the asynchronous transfer mode (ATM) technique. As mentioned, the buffer BUF buffers the data DAT presented to the transmitter TX. However, it has to be understood that the buffer BUF will only do this when it is necessary i.e. when the transmitter receives more data DATA then it is allowed to send.

The idle data generating means ID-GEN is included to generate idle data. It has to be remarked that this is provided to enable the use of one of the typical ATM functionalities. Idle data is send whenever there is no information available at the side of the sender at the moment of transmission. This allows a full asynchronous operation of both sender and receiver.

The data sending means DAT-SEND is included to send data from the transmitter TX to the ADSL modem. This data can be useful user information i.e. the data DAT coming from the buffer BUF or idle data, coming from the idle data generating means ID-GEN.

The trigger receiving means T-RX is included to receive trigger signals T coming from the ADSL modem. Upon receipt of such a trigger signal, the data sending means DAT-SEND is in turn triggered by the trigger receiving means T-RX and is allowed to send data.

The ADSL modem includes besides a receiver RX also the characteristic functional blocks of an ADSL modem. Since the description of the ADSL technology goes beyond the scope of this invention, these functional blocks are not shown in the figure. However, it is worth mentioning here that one of the functional blocks of such an ADSL modem is a framer which organizes overhead information and user information i.e. the incoming data DAT into ADSL frames, i.e. uniformly sized groups of bits used to organize the ADSL data stream.

The receiver RX includes three functional blocks trigger generating means T-GEN;

trigger sending means T-SEND; and data receiving means DAT-RX.

The trigger generating means T-GEN is included to generate trigger signals T from an available signal SIG in the receiver RX. This available signal SIG is generated in accordance with the time moments whenever data DAT is needed to fit into an available ADSL frame in a predetermined place. This signal SIG is not necessarily a clock signal. Indeed, looking to the form of an ADSL frame, the whole frame need not be filled with data DAT, so as a consequence the signal SIG is not a signal with a constant frequency.

It has to be remarked here that the trigger signals T are allowed to be of any kind e.g. one single bit pulse or a predefined codeword as long as the trigger generating means T-GEN of the receiver RX and the trigger receiving means T-RX of the transmitter TX are lined up with each other i.e., T-RX of the transmitter can recognize the trigger signals T.

The trigger sending means T-SEND is included to send the trigger signals T from the receiver RX to the transmitter TX and the data receiving means DAT-RX is included to receive the data DAT coming from the transmitter TX.

The transmission medium for sending the trigger signals is in the figure depicted as a separate line to simplify the description of the working of the system. However these signals can (and usually are) transmitted over the same transmission medium, i.e. a single twisted wire pair, as the data.

The principle working of the synchronization system will be described in the following paragraph.

Whenever data DAT is needed to fit in an available ADSL frame in a predetermined place, a trigger signal T is generated from the available signal SIG and transmitted to the transmitter TX. Upon receipt of a trigger signal T the trigger receiving means T-RX gives a signal to the data sending means DAT-SEND, e.g., by means of a control signal, and DAT-SEND in turn makes a signal request for DAT to the buffer BUF. When there is data DAT available in the buffer BUF, the data DAT is provided to the data sending means DAT-SEND. However, when no data DAT is available in the buffer, the synchronization process may not be disturbed and the data sending means DAT-SEND requests idle data to the idle data generating means ID-GEN. The data, either user data or idle data, is sent to the receiver RX and arrives there at the right moment to fit immediately into the ADSL frame in the predetermined place whereby synchronization is established between the data DAT and the available signal SIG.

It has to be remarked that upon receipt of a trigger signal T, the transmitter TX has to send data DAT to the receiver RX. Sending data can be done immediately after receiving of the trigger signal T, however the invention is not restricted to such kind of synchronization systems but is also applicable for synchronization systems where the data DAT is only sent after a predetermined period. Indeed, in this particular embodiment, the total period between the moment of generating a particular trigger and the moment of data DAT arriving at the receiver RX to accordingly fit into a predefined ADSL frame must be taken into account at initialization time. It can be necessary to have a predetermined waiting period somewhere in the loop in order to be able to realize the synchronization. Since the complexity is moved from the receiver RX to the transmitter TX, this waiting period will also be realized by the transmitter TX.

It has to be remarked that due to the cell structure of the ATM data stream whenever idle data, not corresponding to a complete idle cell has been sent, that upon receipt of subsequent trigger signals T idle data has to be sent until the complete idle cell is transmitted, even if in the mean time some data DAT becomes available in the buffer BUF.

While the principles of the invention have been described above in connection with specific apparatus, it is to be clearly understood that this description is made only by way of example and not as a limitation on the scope of the invention.

We claim:

1. A method to realize synchronization in a receiver (RX), of data (DAT) sent from a transmitter (TX) to said receiver (RX), with a signal (SIG) available in said receiver (RX) characterized in that said method includes the steps of:

in said receiver (RX) generating said signal available in said receiver in accordance with time moments whenever data is needed to fit into an available time frame in a predetermined place, wherein said signal available in said receiver is not a signal with a constant frequency;

in said receiver (RX) generating trigger signals (T) from said signal (SIG) available in said receiver;

sending said trigger signals (T) from said receiver (RX) to said transmitter (TX) to indicate that the transmitter is allowed to send said data (DAT); and upon receipt of said trigger signals (T) by said transmitter (TX) sending said data (DAT) from said transmitter (TX) to said receiver (RX) wherein said data (DAT) is for receipt in said receiver already synchronized with said signal (SIG) available in said receiver and without any need for further synchronization with a reference signal in said receiver and consequently without any need for buffering said data in said receiver.

2. The method according to claim 1, characterized in that said data is asynchronous data.

3. The method according to claim 1, characterized in that in the event that no data is available in said transmitter (TX) to be sent upon receipt of said trigger signals, said method further includes the step of sending idle data from said transmitter (TX) to said receiver (RX).

4. A receiver (RX) for receiving from a transmitter (TX) data (DAT), said data (DAT) having to be synchronous with a signal (SIG) available in said receiver (RX), characterized in that said receiver (RX) includes:

trigger generating means (T-GEN) to generate trigger signals (T) from said signal (SIG) available in said receiver wherein said signal available in said receiver is indicative of time moments whenever data is needed to fit into an available time frame in a predetermined place, wherein said signal available in said receiver is not a signal with a constant frequency;

trigger sending means (T-SEND) to send said trigger signals (T) from said receiver (RX) to said transmitter (TX); and data receiving means (DAT-RX) to receive said data (DAT) sent by said transmitter (TX) to said receiver (RX) upon receipt of said trigger signals (T) wherein said data (DAT) is for receipt in said receiver already synchronized with said signal (SIG) available in said receiver and without any need for further synchronization with a reference signal in said receiver and consequently without any need for buffering said data in said receiver.

5. The receiver (RX) according to claim 4, characterized in that said receiver (RX) is included in an asymmetric digital subscriber line modem.

6. A transmitter (TX) for transmitting data (DAT) to a receiver (RX), said data (DAT) having to be synchronous with a signal (SIG) available in said receiver (RX), characterized in that said transmitter (TX) includes:

trigger receiving means (T-RX) to receive trigger signals (T), generated by said receiver (RX) from said signal (SIG) available in said receiver and sent from said receiver (RX) to said transmitter (TX) wherein said signal available in said receiver is indicative of time moments whenever data is needed to fit into an available time frame in a predetermined place, wherein said signal available in said receiver is not a signal with a constant frequency; and data sending means (DAT-SEND) to send data (DAT) from said transmitter (TX) to said receiver (RX) upon receipt of said trigger signals (T) wherein said data (DAT) is for receipt in said receiver already synchronized with said signal (SIG) available in said receiver and without any need for further synchronization with a reference signal in said receiver and consequently without any need for buffering said data in said receiver.

7. The transmitter (TX) according to claim 6, characterized in that said transmitter (TX) includes means to send said data (DAT) in an asynchronous way.

8. The transmitter (TX) according to claim 6, characterized in that said transmitter (TX) includes side data generating means (ID-GEN) to generate idle data and to send said idle data from said transmitter (TX) to said receiver (RX) in the event that no data (DAT) is available in said transmitter (TX) upon receipt of said trigger signals (T).

* * * * *

UNITED STATES PATENT AND TRADEMARK OFFICE
CERTIFICATE OF CORRECTION

PATENT NO. : 5,903,612
DATED : May 11, 1999
INVENTOR(S) : Van Der Putten et al

It is certified that error appears in the above-identified patent and that said Letters Patent is hereby corrected as shown below:

At [INID] 57, line 7, please insert --;-- after "receiver".

At col. 4, line 54, please insert --,-- after "receiver (RX)" at the end of the line.

At col. 5, line 10, please insert --(DAT)-- after "said data".

At col. 6, line 32, please cancel "side" and substitute --idle-- therefor.

Signed and Sealed this

Twenty-third Day of November, 1999

Attest:

Q. TODD DICKINSON

*Attesting Officer*    *Acting Commissioner of Patents and Trademarks*